United States Patent [19]

Fukushima et al.

[11] Patent Number: 4,923,552
[45] Date of Patent: May 8, 1990

[54] METHOD OF PRODUCING LIQUID CRYSTAL DISPLAY ELEMENT

[75] Inventors: Tetsuo Fukushima; Takao Inoue, both of Hirakata; Keinosuke Kanashima, Osaka, all of Japan

[73] Assignee: Matsushita Electric Industrial Co., Ltd., Osaka, Japan

[21] Appl. No.: 203,814

[22] Filed: Jun. 8, 1988

[30] Foreign Application Priority Data

Jun. 12, 1987 [JP] Japan .................... 62-147588

[51] Int. Cl.⁵ .................. B32B 31/20; B32B 31/28
[52] U.S. Cl. .................... 156/273.7; 156/275.3; 156/275.5; 156/275.7; 156/285
[58] Field of Search ............... 350/343, 344, 334, 330, 350/339 R, 339 F, 320; 156/272.2, 275.5, 285, 286, 273.7, 273.9, 275.1, 382, 275.7, 275.3; 428/1; 269/21; 250/492.1

[56] References Cited

U.S. PATENT DOCUMENTS

| | | | |
|---|---|---|---|
| 4,382,833 | 5/1983 | Coyle et al. | 156/285 X |
| 4,388,128 | 6/1983 | Ogawa et al. | 156/273.7 X |
| 4,466,701 | 8/1984 | Ogata et al. | 350/343 X |
| 4,691,995 | 9/1987 | Yamazaki et al. | 350/343 X |
| 4,715,686 | 12/1987 | Iwashita et al. | 350/339 R |
| 4,743,098 | 5/1988 | Dickerson et al. | 350/339 F |

FOREIGN PATENT DOCUMENTS

| | | | |
|---|---|---|---|
| 0147612 | 11/1980 | Japan | 350/320 |
| 0070520 | 5/1982 | Japan | 350/330 |
| 0057221 | 4/1984 | Japan | 350/343 |
| 0140422 | 8/1984 | Japan | 350/330 |

Primary Examiner—Merrell C. Cashion, Jr.
Attorney, Agent, or Firm—Stevens, Davis, Miller & Mosher

[57] ABSTRACT

A method of producing a liquid crystal display element comprising the steps of placing too substrates opposite to each other through gap structures, superposing the two substrates through a sealing agent, fixing the substrates to a fixing base, placing a transparent plastic sheet on the substrate, evacuating the space between the fixing base and the plastic sheet to produce a vacuum so as to press the substrates together under vacuum, and photo-setting the sealing agent press-bonded to the substrates. Since insertion of the substrates into a plastic bag and vacuum packing thereof are not required for pressing the substrates, slippage in the alignment of the substrates does not easily occur. In addition, since there are not steps of heat-setting and insertion into and extraction from a bag, the number of steps and the cost of materials are reduced, and the process can be easily automated.

3 Claims, 11 Drawing Sheets

METHOD OF PRODUCING LIQUID CRYSTAL DISPLAY ELEMENT

TECHNICAL FIELD

The present invention relates to a method of producing a liquid crystal display element used in a liquid crystal television.

BACKGROUND ART

The demand for matrix-type displays as simple display devices has recently increased with the increase in the kinds of apparatus containing microcomputers. In addition, since the definition in computer terminal displays and in high-quality televisions is being made increasingly high, it is necessary that display devices using liquid crystals each have an electrode pattern of a high density and that the thickness of a liquid crystal layer sealed between glass substrates be small.

Conventionally, control has been made to the gap in a liquid crystal panel by dispersing spacers having a given diameter on one of the substrates, bonding the upper and lower substrates by a given method, and then setting a sealing resin at a given temperature or by applying UV light while applying a load such as an iron block.

Figure 6:
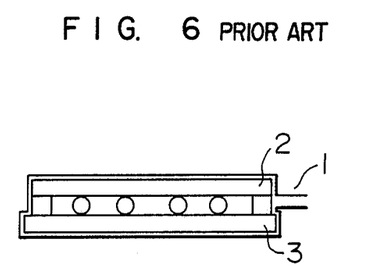
FIGS. 6 and 7 are explanatory views of conventional methods of producing a liquid crystal display element.
Figure 7:
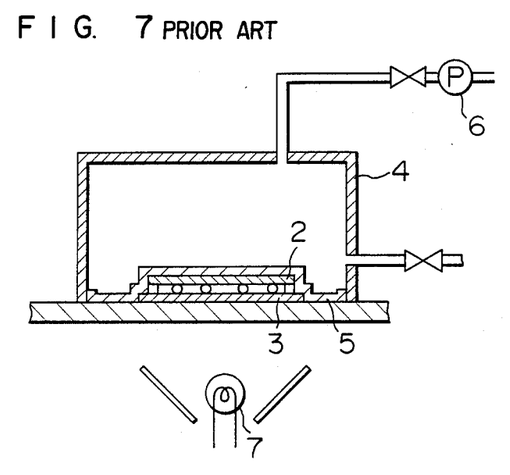

In addition, in order to form more uniform gaps, the method shown in FIG. 6 has been proposed in which substrates 2, 3, which have been subjected to alignment, are inserted into a bag 1 made of a heat-shrinkable film, with uniform pressure being applied to the bag by vacuum packing or heating instead of using the iron block. The method shown in FIG. 7 has also been proposed in which substrates 2, 3, which have been subjected to alignment, are placed in a pressure vessel 4, a partition member 5 made of silicone rubber is fixed thereto, then a pressure fluid such as water or oil is pumped into the vessel by a pump 6, and UV setting is performed by thermal setting or UV irradiation using a mercury lamp 7 in the state wherein the substrates 2, 3 are pressed.

The above-described methods have several problems and thus do not always yield a uniform panel gap and alignment information, resulting in a decrease in the yields of the methods. The method using the bag made of heat-shrinkable film has the following problems:

(1) When the substrates are inserted into the bag made of a heat-shrinkable film, slippage occurs in the alignment of the substrates.

(2) When vacuum packing is performed after the substrates have been inserted into the bag made of a heat-shrinkable film, slippage occurs in the alignment of the substrates. In addition, a jig is required for reducing the slippage, and the number of repetitions is thus increased.

(3) The electrodes on the substrates may be damaged by the additives in the heat-shrinkable film during heating.

(4) The processes of insertion of the substrates into the bag and the extraction therefrom after setting require long working times and cannot be easily provided in a line system.

(5) One bag is required for one pair of substrates, leading to a high cost.

Figure 8:
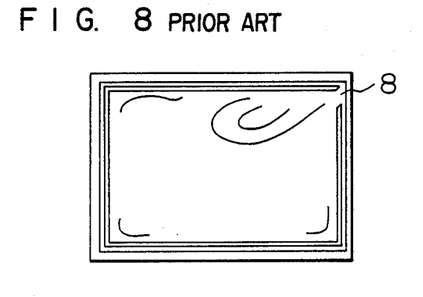
FIG. 8 is a drawing of the state wherein irregularities occur in the gap by the conventional methods shown in FIGS. 6 and 7.

(6) Since beads used as gap materials in some cases spring out from an injection port 8 for a liquid crystal which is interposed between the substrates if the pressure is rapidly reduced during vacuum packing, as shown in FIG. 8, irregularities are produced in the gap. These irregularities in the gap can be observed as the interference fringes shown in the drawing by irradiation of Na rays.

The method using a pressure fluid for pressing has the following problems:

(7) When the partition member made of silicone rubber is fixed, slippage occurs in the alignment of the two substrates.

(8) When the pressure fluid flows into the vessel after the partition member has been fixed, slippage also occurs in the alignment of the two substrates.

(9) Since it is necessary to sufficiently consider a sealed structure of the apparatus which is thus made large, the cost is thus increased.

(10) Since the pressure fluid is caused to flow and to be discharged for each of two substrates, the working time is increased.

(11) If a filter containing an organic dye, etc. is formed on the substrates when UV light is applied, a change in the properties of the organic dye or decomposition thereof takes place in some cases.

DISCLOSURE OF THE INVENTION

Accordingly, it is a main object of the present invention to provide a method of producing a liquid crystal panel which, during the assembly of the liquid crystal panel, produces no slippage in the alignment of the two substrates, requires a small number of processes and little cost of materials, and does not cause the electrodes on the substrates to be damaged by a heat-shrinkable film used for pressing.

It is a second object of the present invention to provide a method of producing a liquid crystal panel which, when a color filter containing an organic dye, etc. that is subjected to change in its properties or to decomposition by ultraviolet rays is formed on substrates, produces neither change in properties of the organic dye nor decomposition thereof due to ultraviolet rays.

It is a third object of the present invention to provide a method of producing a liquid crystal panel which produces no irregularities in the gap between two substrates after they have been bonded.

The main object of the present invention can be achieved by a method in which a first electrode substrate and a second electrode substrate are subjected to alignment using an alignment apparatus and then superposed through a sealing agent to an extent which produces substantially no slippage in the positions to obtain a temporarily assembled liquid crystal panel which is then fixed to an adsorption fixing base in a case in which pressure can be reduced, and on which a transparent plastic sheet is placed, and a space between the adsorption fixing base and the plastic sheet is evacuated to produce a vacuum so that the temporarily assembled liquid crystal panel is pressed under vacuum and the sealing agent pressed is photo-set.

The present invention also includes a method of producing a liquid crystal display element in which a second electrode substrate is adsorbed by an upper adsorption jig in an alignment apparatus and a first electrode substrate is adsorbed by a lower adsorption jig therein, the two substrates are then superposed through a sealing agent to an extent which produces substantially no slippage in the positions by relatively moving the adsorption jigs and are pressed to obtain a temporarily assembled liquid crystal panel which is then fixed to an adsorption fixing base that is placed in a case at reducible pressure and that has the same adsorption pattern as the lower adsorption jig in the alignment apparatus and on which a transparent plastic sheet is placed, a space between the adsorption fixing base and the plastic sheet is evacuated to produce a vacuum so that the temporarily assembled liquid crystal panel is pressed and the sealing agent pressed is photo-set to obtain a liquid crystal panel.

The present invention further includes a method of producing a liquid crystal display element in which two substrates are subjected to alignment using an alignment apparatus, then superposed through a sealing agent to such an extent that substantially no slippage is produced, and then pressed to obtain a temporarily assembled liquid crystal panel which is subsequently fixed to an adsorption fixing base in a case interposed between a feed roll for a transparent sheet and a take-up roll, the plastic sheet is caused to approach the temporarily assembled liquid crystal panel, the space between the adsorption fixing base and the plastic sheet is evacuated to produce a vacuum so that the temporarily assembled liquid crystal panel is pressed, and the sealing agent pressed is photo-set to obtain a liquid crystal panel, the take-up roll being rotated when a new temporarily assembled liquid crystal panel is pressed under vacuum so that a plastic sheet surface having no deformation is placed on the substrates and the new temporarily assembled liquid crystal panel is pressed under vacuum to obtain a liquid crystal panel.

The second object of the present invention can be achieved by a method in which two substrates are subjected to alignment using an alignment apparatus, then superposed through a sealing agent to such an extent that substantially no slippage is produced in the positions, and then pressed to a temporarily assembled liquid crystal panel which is then fixed to an adsorption fixing base in a case at reducible pressure, a transparent plastic sheet is caused to approach the temporarily assembled liquid crystal panel, the space between the adsorption fixing base and the plastic sheet is evacuated to produce a vacuum, and ultraviolet rays are applied through a mask substrate having shield regions formed thereon in the state wherein the temporarily assembled liquid crystal panel is pressed under vacuum in such a manner that the ultraviolet rays are applied to the region with the sealing agent and no ultraviolet rays are applied to the other region so that the sealing agent pressed is photo-set.

The third object of the present invention can be achieved by a method in which two substrates are subjected to alignment using an alignment apparatus, then superposed through a sealing agent to such an extent that substantially no slippage is produced in the positions, and pressed to obtain a temporarily assembled liquid crystal panel which is then fixed to an adsorption fixing base in a case at reducible pressure, a plastic sheet is caused to approach the temporarily assembled liquid crystal panel, the pressure in the space between the adsorption fixing base and the plastic sheet is first reduced to about 1 to 160 torr and then to 1 torr or less in two or more steps or at two or more of pressure reduction rates so that the temporarily assembled liquid crystal panel is pressed under vacuum, and the sealing agent is then set.

In accordance with a first invention of the present application, in a method of producing a liquid crystal display element, two substrates are subjected to alignment using an alignment apparatus, superposed through a sealing agent to such extent that substantially no slippage is produced in the positions, and pressed to obtain a temporarily assembled liquid crystal panel which is then fixed to an adsorption fixing base in a case at reducible pressure and on which a transparent plastic sheet is placed, the plastic sheet is adsorbed on the adsorption fixing base under vacuum so that the temporarily assembled liquid crystal panel is pressed under vacuum, and the sealing agent press-bonded to the substrates is photo-set to obtain a liquid crystal panel. Therefore the first invention has the following effects:

(1) Since there is no need for the steps of inserting the substrates into a bag and pressing by vacuum packing, and since the pressing is performed after the substrates have been superposed, slippage does not easily occur in the alignment.

(2) Since there is no need for the steps of inserting the substrates into a bag and extracting them therefrom and heat setting, the number of steps is small and the cost of materials is low, and automation can be easily realized.

(3) Electrodes on the substrates are not damaged by heating of a heat-shrinkable film.

In accordance with a second invention of the present application, a second electrode substrate is adsorbed by an upper adsorption jig in an alignment apparatus and a first electrode substrate is adsorbed by a lower adsorption jig therein, the two substrates are superposed through the intermediary of a sealing agent to such an extent that substantially no slippage is produced in the positions by relatively moving the adsorption jigs and they are then pressed to obtain a temporarily assembled liquid crystal panel that is then fixed to an adsorption fixing base which is placed in a case at reducible pressure and that has the same adsorption pattern as that of the lower adsorption jig in the alignment apparatus, and on which a transparent plastic sheet is placed, the space between the adsorption fixing base and the plastic sheet is evacuated to produce a vacuum so that the temporarily assembled liquid crystal panel is pressed under vacuum, and the sealing agent pressed is photo-set to obtain a liquid crystal panel. Therefore, the second invention has the same effects as effects (1) to (3) obtained by the first invention as well as the following effects:

(4) Since the deformation of the first electrode substrate due to adsorption produced during alignment, superposition and pressing of the two substrates is substantially equal to that produced during pressing under vacuum and photo-setting, slippage in the alignment produced during the pressing under vacuum is reduced.

In accordance with a third invention of the present application, two substrates are subjected to alignment using an alignment apparatus, superposed through a sealing agent to such an extent that substantially no slippage is produced in the positions, and pressed to obtain a temporarily assembled liquid crystal panel which is then fixed to an adsorption fixing base at reducible pressure that is interposed between a feed roll and take-up roll for a transparent plastic sheet, the plastic sheet is brought near to the temporarily assembled liquid crystal panel, the space between the adsorption fixing base and the plastic sheet is evacuated to produce a vacuum so that the temporarily assembled liquid crystal panel is pressed under vacuum, and the sealing agent press-bonded to the substrates is photo-set to obtain a liquid crystal panel, the take-up roll being rotated when a new temporarily assembled liquid crystal panel is pressed under vacuum so that a plastic sheet surface having no deformation is placed on the substrates, and the temporarily assembled liquid crystal panel is pressed under vacuum. Therefore, the third invention has the same effects as the effects (1) to (3) obtained by the first invention as well as the following effect:

(5) Since pressing can always be performed with a plastic sheet having no deformation, the conditions of pressing are stabilized, and thus slippage in the alignment is reduced.

In accordance with a fourth invention of the present application, two substrates are subjected to alignment using an alignment apparatus, superposed through a sealing agent to such an extent that substantially no slippage is produced in the positions, and pressed to obtain a temporarily assembled liquid crystal panel which is then fixed to an adsorption fixing base in a case at reducible pressure, a transparent plastic sheet is brought near the temporarily assembled liquid crystal panel, the space between the adsorption fixing base and the plastic sheet is evacuated to produce a vacuum, and, in the state wherein the temporarily assembled liquid crystal panel is pressed under vacuum, the sealing agent press-bonded to the substrates is photo-set by applying ultraviolet rays through a mask substrate having a shield region formed thereon in such a manner that the ultraviolet rays are applied to the region with the sealing agent and no ultraviolet rays are applied to the other region so that the sealing agent press-bonded to the substrates is photo-set to obtain a liquid crystal panel. Therefore, the fourth invention has the same effects as the effects (1) to (3) of the first invention as well as the following effect:

(5) When a color filter containing an organic dye, etc. which is subjected to change in its properties or decomposition by ultraviolet rays is formed on the substrates, it is possible to prevent the filter from being irradiated with the ultraviolet rays and thus prevent any change in properties of the organic dye or any decomposition thereof.

In accordance with a fifth invention of the present application, two substrates are subjected to alignment using an alignment apparatus, superposed through a sealing agent to such an extent that substantially no slippage is produced in the positions, and pressed to obtain a temporarily assembled liquid crystal panel which is then fixed to an adsorption fixing base in a case at reducible pressure, a plastic sheet is brought near the temporarily assembled liquid crystal panel, the pressure in the space between the adsorption fixing base and the plastic sheet is gradually reduced to about 1 to 160 torr then to 1 torr in two or more stages or at two or more pressure reduction rates so that the temporarily assembled liquid crystal panel is pressed under vacuum, and the sealing agent is then photo-set. Therefore, the fifth invention has the same effects as the effects (1) to (3) of the first invention as well as the following effects:

(7) Since there is no rapid change in pressure until the two substrates are substantially brought into contact with the gap materials, slippage in the alignment of the substrates does not easily occur during the pressure under vacuum.

(8) Since the pressure is reduced to a high vacuum after the substrates have been brought into contact with the gap materials, the gap materials do not spring out from an injection port for a liquid crystal, and thus no irregularity occurs in the gap.

BRIEF DESCRIPTION OF THE DRAWINGS

FIGS. 1(*a*) to 1(*d*) show a first embodiment of the present invention, FIG. 1(*a*) being a perspective view of an alignment apparatus, FIG. 1(*b*) being a perspective view of an apparatus for bonding and setting substrates, FIG. 1(*c*) being a front view of the bonding/setting apparatus, and FIG. 1(*d*) being a flowchart of a process of producing a liquid crystal panel;

FIGS. 2(*a*) to 2(*c*) show a second embodiment of the present invention, FIG. 2(*a*) being a perspective view of an adsorption table provided below an alignment apparatus and FIGS. 2(*b*) and 2(*c*) being respectively drawings of the process of this embodiment and a comparative process:

FIG. 3(*a*) is a perspective view of an apparatus for bonding and setting substrates in a third embodiment of the present invention, and FIGS. 3(*b*) and 3(*c*) are side views of modifications of the apparatus for bonding and setting substrates in the third embodiment;

FIG. 5(*a*) is a perspective view of an apparatus for bonding and setting substrates in a fifth embodiment of the present invention, and FIGS. 5(*b*) to 5(*e*) are drawings of the process of this embodiment;

BEST MODE FOR CARRYING OUT THE INVENTION

Figure 1A:
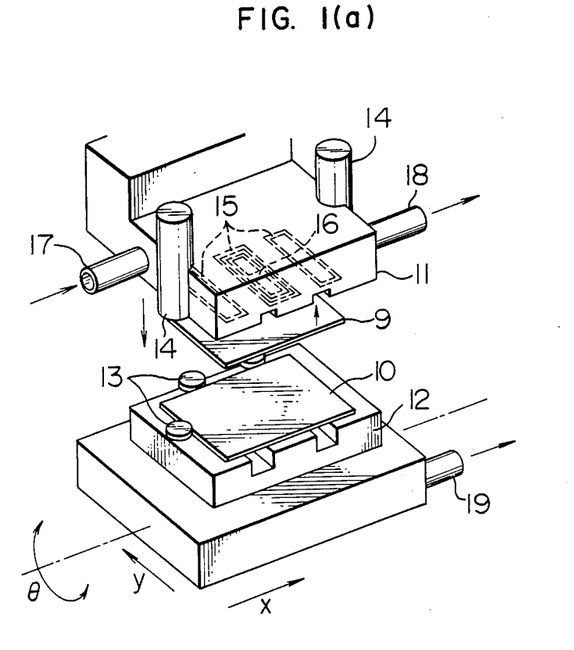
Figure 1B:
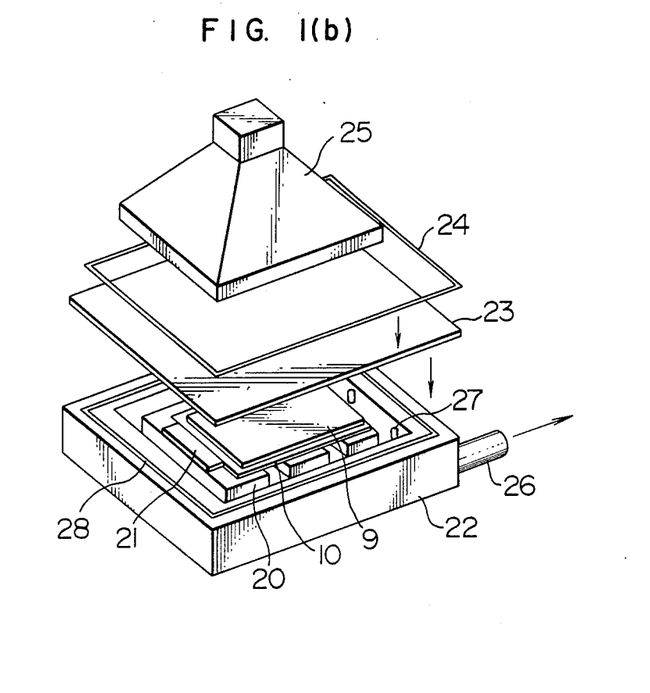

A method of producing a liquid crystal display element in a first embodiment of the present invention is described below with reference to FIGS. 1(*a*) and 1(*b*). FIG. 1(*a*) is a perspective view of an alignment apparatus in the first embodiment of the present invention. In the drawing, reference numeral 9 denotes a second electrode substrate; reference numeral 10, a first electrode substrate; reference numeral 11, an adsorption jig for the second electrode substrate; reference numeral 12, an adsorption jig for the first electrode substrate; reference numeral 13, pins for positioning the first electrode substrate; reference numeral 14, objective lenses used for alignment; reference numeral 15, slits used for air pressure; reference numeral 16, an adsorption groove; reference numeral 17, a pressure air supply port; reference numeral 18, a pressure reducing port for the second electrode substrate; and reference numeral 19, a pressure reducing port for the first electrode substrate. FIG. 1(*b*) is a perspective view of an apparatus for bonding and setting substrates in this embodiment. In the drawing, reference numeral 20 denotes an adsorption fixing base for a temporarily assembled liquid crystal panel; reference numeral 21, a positioning member for the temporarily assembled liquid crystal panel; reference numeral 22, a case for the apparatus for bonding and setting substrates; reference numeral 23, a plastic sheet used for pressing; reference numeral 24, a member for fixing the pressing plastic sheet; reference numeral 25, an ultraviolet ray irradiation lamp; reference numeral 26, an exhaust vent for reducing pressure; and reference numeral 28, a groove portion for more fixing the sheet to the fixing member.

When bonding, setting and the formation of a gap are performed, the second electrode substrate 9 is first adsorbed by the adsorption jig 11, and the position of the second electrode substrate 9 is recognized through the objective lenses 14. The first electrode substrate 10 is then adsorbed by the adsorption jig 12, the position of the first electrode substrate 10 is recognized, and the deviation from the position of the second electrode substrate 9 is calculated. The first electrode substrate is moved in the X, Y and $\theta$ directions on the basis of the data from the calculation to perform alignment. The adsorption jig 11 for the second electrode substrate 9 is then moved downwardly and placed on the first electrode substrate 10 so that there is substantially no deviation in the positions of the two substrates 9, 10. The adsorption of the second electrode substrate 9 is removed, and air is blown out from the air pressure slits 15 so as to press the substrates 9, 10. The temporarily assembled and bonded liquid crystal panel is then moved to the adsorption fixing base 20 in the case 22 in the pressure setting apparatus, and the pressing plastic sheet 23 is placed on the substrates and then fixed by using the sheet fixing member 24. The pressure in the space between the adsorption fixing base 20 and the plastic sheet 23 in the case 22 of the bonding/setting apparatus is reduced by vacuum suction, and the adhesive is set by applying UV rays using the ultraviolet ray irradiation lamp 25 in the state wherein a uniform force is applied to the substrates.

Figure 1C:
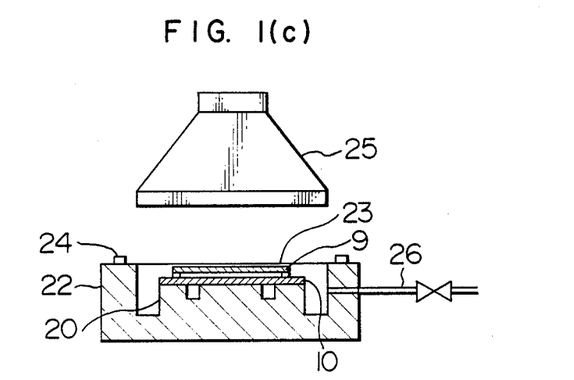
Figure 1D:
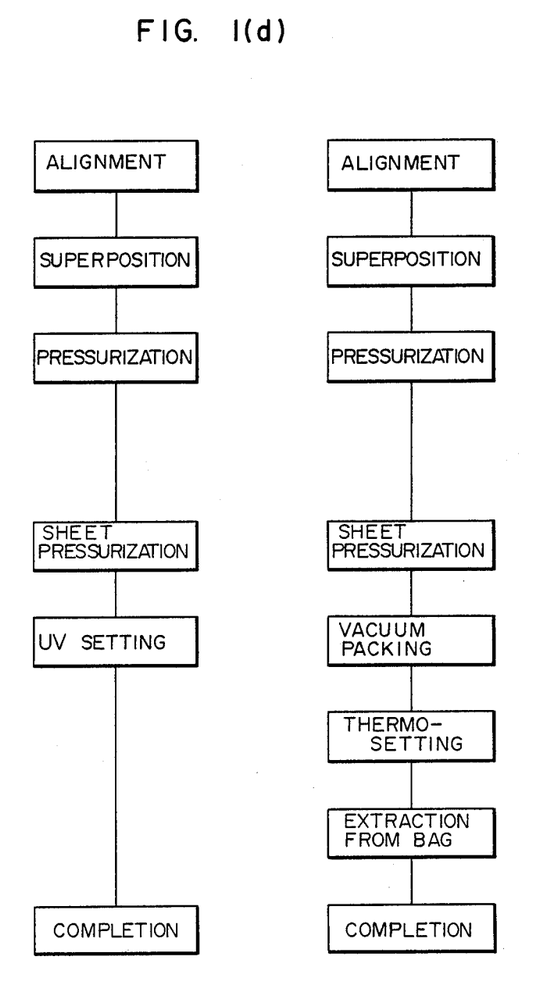

FIG. 1(c) is a front view of the bonding/setting apparatus of the present invention in the state wherein the two substrates 9, 10 are fixed to the adsorption fixing base 20. FIG. 1(d) shows a comparison between the process of producing a liquid crystal panel in the present invention and a conventional process of producing a liquid crystal panel. As seen from the drawing, the number of stages in the process of the present invention is greatly reduced as compared with that of the conventional process.

As described above, in this embodiment, the two substrates are subjected to alignment, superposed, and pressed, the sheet is then placed on the substrates, and the sealing agent press-bonded to the substrates is photo-set by applying UV rays in the state wherein the substrates are uniformly pressed. Therefore, since this embodiment has no stages of inserting the substrates into a bag and vacuum packing, slippage in the alignment does not easily occur, and the number of stages is reduced. In addition, electrodes on the substrates are not damaged by heating of a heat-shrinkable film.

A description will now be made of a second embodiment of the present invention.

Figure 2A:
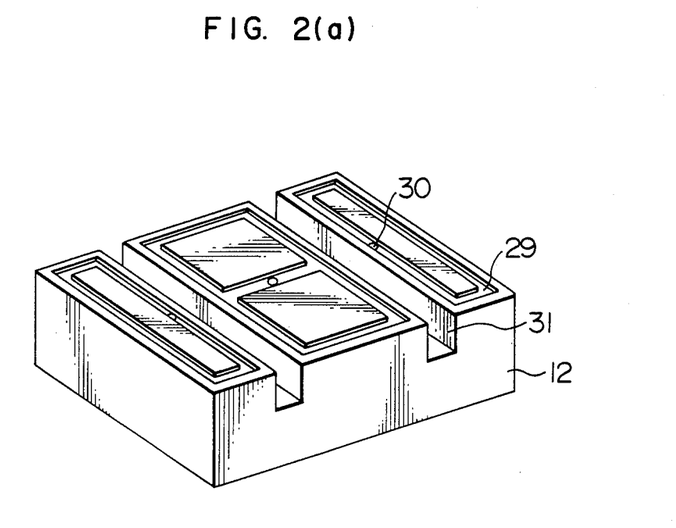

FIG. 2(a) is a perspective view of the adsorption fixing jig 12 for the first electrode substrate 10 in the alignment apparatus. In the drawing, reference numeral 29 denotes an adsorption pattern; reference numeral 30, pressure reducing holes; and reference numeral 31, notches for a mounting fork. The adsorption pattern of the adsorption fixing base 20 in the bonding/setting apparatus is so formed as to have the same pattern as the adsorption pattern 29.

In the operation of the second embodiment, the alignment, superposition, and pressing of the two substrates, and their mounting on the bonding/setting apparatus, the fixing of the sheet, and the setting of the sealing agent by applying UV rays while uniformly pressing the substrates are performed by using the alignment apparatus described in the first embodiment and the bonding/setting apparatus having the adsorption fixing base 20 with the same adsorption pattern as that of the adsorption jig 12 in the same way as those employed in the first embodiment.

Figure 2B:
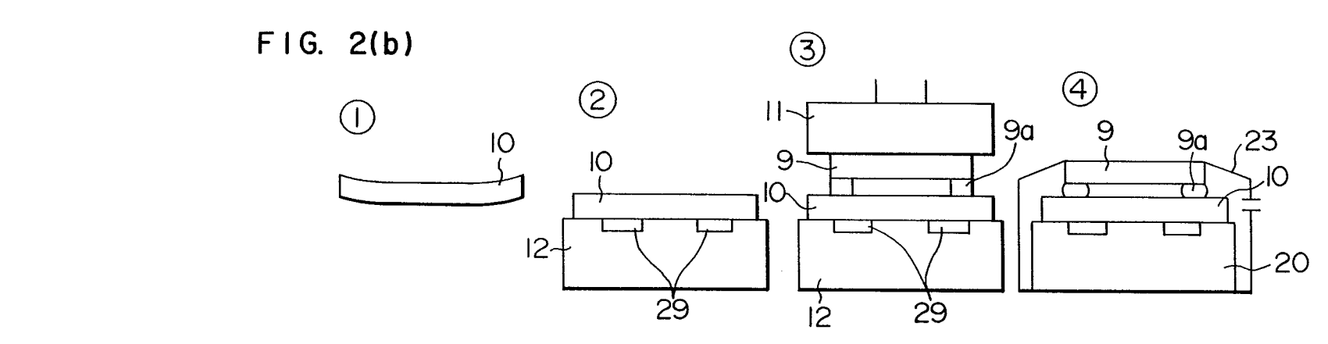
Figure 2C:
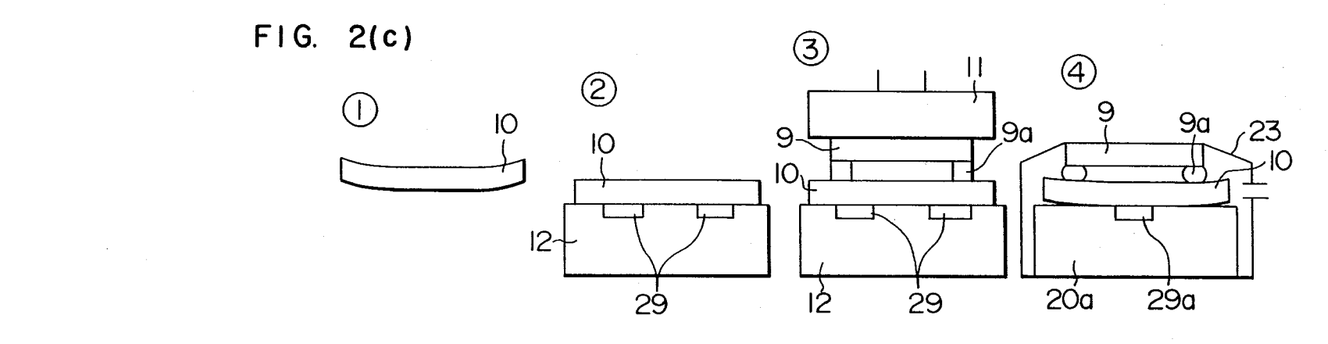

FIGS. 2(b) and 2(c) show the operation in detail, FIG. 2(b) showing the operation of the second embodiment and FIG. 2(c) showing a comparative operation. In the drawings, reference numeral 9 denotes the second electrode substrate; reference numeral 10, the first electrode substrate; reference numeral 11, an upper adsorption base in the alignment apparatus; reference numeral 12, a lower adsorption base in the alignment apparatus; reference numeral 23, a plastic sheet used for pressing by vaccum pressure reduction; reference numeral 29, an adsorption pattern; reference numeral 20, an adsorption fixing base in the bonding/setting apparatus which has the same adsorption pattern 29 as that of the lower adsorption fixing jig 20 in the alignment apparatus; and reference numeral 20a, an adsorption fixing base having any pattern 29a. In FIG. 2(b), when the first electrode substrate 10 which is deformed to a certain degree in step 1 is fixed to the adsorption jig 12, as shown in step 2, the absolute amount of deformation is reduced, but the first electrode substrate 10 is deformed corresponding to the adsorption pattern 29. In step 3, the second electrode substrate which is previously subjected to alignment and adsorbed by the upper adsorption jig 11 is placed on the first substrate through a sealing agents 9a, and the two substrates are pressed at given pressure. In step 4, the two substrates superposed are removed from the adsorption jig 12 and moved onto the adsorption fixing base 20 in the bonding/setting apparatus, and the plastic sheet 23 is placed on the substrates which are then pressed by reducing pressure On the other hand, in FIG. 2(c), although steps 1 to 3 are exactly the same as those shown in FIG. 2(b), in step 4, the adsorption pattern 29a of the adsorption fixing base 20a in the bonding/setting apparatus is different from the adsorption pattern 29 of the lower adsorption fixing jig 12 in the alignment apparatus.

The first electrode substrate 10 has a thickness of about 1 mm and an area of about 30 $cm^2$ and the property that, if it is adsorbed for a given time, the shape of the first electrode substrate 10 is maintained even if the adsorption is removed. Therefore, the first electrode substrate 10 is barely deformed when it is moved to the bonding/setting apparatus. In FIG. 2(b), since adsorption is performed by using the same adsorption pattern 29 after the substrates have been moved, the deformation produced is exactly the same as that produced in step 3. Thus, slippage in the alignment during pressure under vacuum is small. While in FIG. 2(c), since the adsorption pattern in step 4 is different from that in step 3, the first electrode substrate 10 is deformed in step 4, and thus the degree of slippage in the alignment is sometimes greater than that produced in the process shown in FIG. 2(b).

As described above, in this embodiment, since the adsorption pattern of the adsorption base for the first electrode substrate in the alignment is the same as that of the adsorption fixing base in the bonding/setting apparatus, the deformation of the first electrode substrate due to adsorption produced during the alignment is substantially the same as that produced during pressing and setting by UV rays in the bonding/setting apparatus. Therefore, substantially no slippage in the alignment occurs during pressure reduction in the bonding/setting apparatus.

Figure 3A:
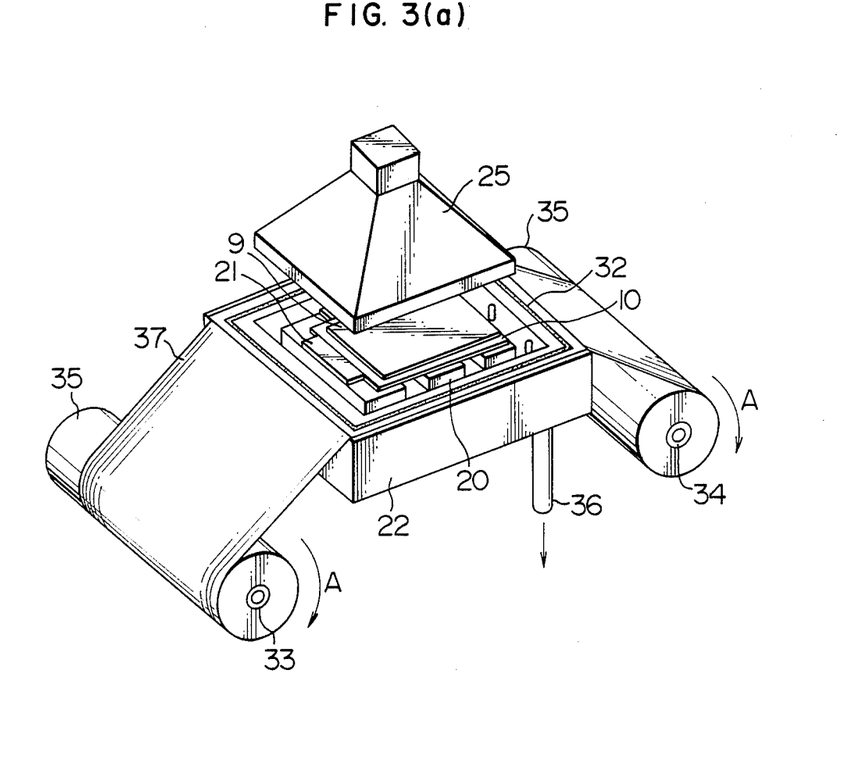

A third embodiment of the present invention is described below with reference to FIGS. 3(a) to 3(c). FIG. 3(a) is a perspective view of the substrate bonding/setting apparatus in this embodiment. In FIG. 3(a), reference numeral 32 denotes rubber packing; reference numeral 33, a feed roll for a plastic sheet; reference numeral 34, a take-up roll therefor; reference numeral 35, a tension controller for a plastic sheet; reference numeral 36, an exhaust vent for reducing pressure; and reference numeral 37, a plastic sheet.

When the bonding and setting of the substrates and the formation of a gap are performed, alignment, superposition and pressing of the substrates are performed in the same manner in the first embodiment, the bonded substrates 9, 10 are moved to the bonding/setting apparatus in the state wherein the plastic sheet 37 is loosened, and the take-up roll 34 is rotated in the direction A so that the plastic sheet 37 is fixed with the tension which is set by the tension controller 35. At this time, the plastic sheet 37 is not in contact with the substrates 9, 10. Then, the pressure in the case 22 of the bonding/setting apparatus is reduced, and the sealing agent is set by applying UV rays to the substrates using the ultraviolet irradiation lamp 25 in the state wherein a uniform force is loaded on the substrates 9, 10. Since the plastic sheet 37 is deformed after the setting has been completed, if the plastic sheet 37 is again used, the distribution of pressure during vacuum pressure reduction is changed. Thus, the take-up roll 34 is rotated in the direction A so that an unused portion of the plastic sheet 37 is placed on the case 22.

Since, as described above, this embodiment is provided with the take-up roll and the feed roll for the plastic sheet, the steps of inserting the substrates into a bag and extracting them from the bag after setting of the sealing agent are not required, resulting in a reduction in the number of steps. Slippage in the alignment is also small. In addition, when a pair of panels are produced, the cost of the production using the plastic sheet is smaller than that using a plastic bag.

Figure 3B:
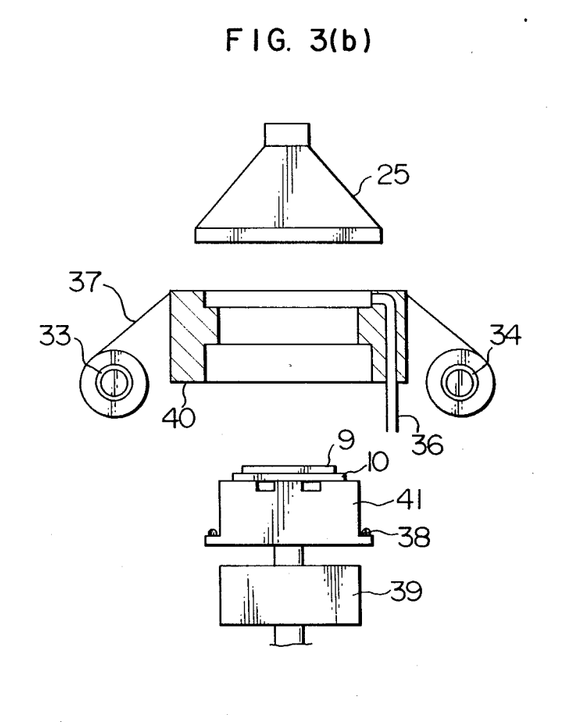
Figure 3C:
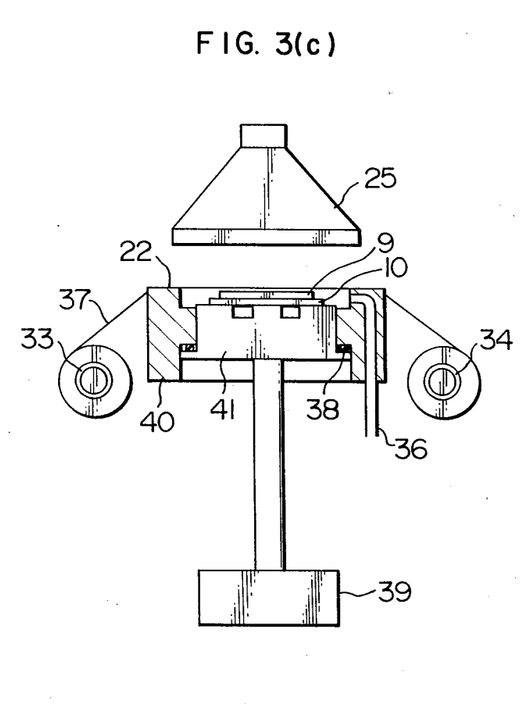

FIGS. 3(b) and 3(c) are modifications of the third embodiment. In FIGS. 3(b), 3(c), reference numeral 39 denotes a drive for longitudinally moving an adsorption fixing table 41 which is used for positioning the substrates after being bonded; reference numeral 38, seal packing; and reference numeral 40, a frame body.

The substrates 9, 10 after being bonded are mounted on the adsorption fixing table 41 used for positioning in the state shown in FIG. 3(b), and moved upwardly by the drive 39 so that the table 41 engages with the frame body 40 to form a case 22, and the sealing agent is set by UV irradiation after pressure reduction. The above-described process can facilitate the movement of the substrates after bonding and reduce the number of steps.

Figure 4:
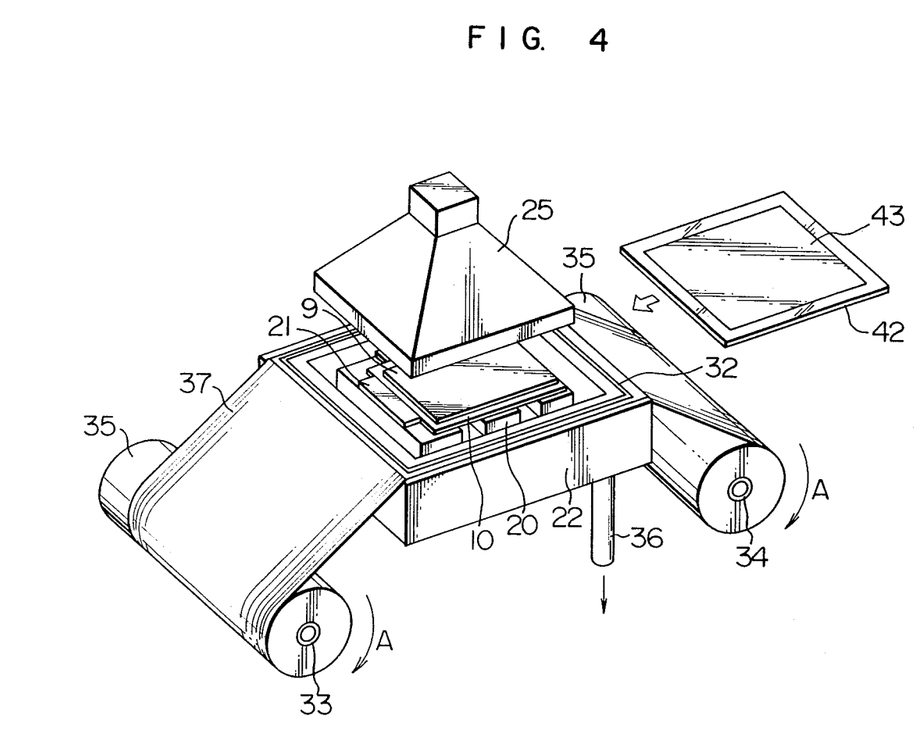
FIG. 4 is a perspective view of an apparatus for bonding and setting substrates in a fourth embodiment of the present invention.

A fourth embodiment of the present invention is described below with reference to FIG. 4. FIG. 4 is a perspective view of the substrate bonding/setting apparatus in this embodiment. In FIG. 4, reference numeral 42 denotes a mask substrate made of quartz glass and reference numeral 43 denotes aluminum vapor-deposited with a specific pattern.

When the bonding and setting of the substrates and the formation of a gap are performed, the alignment, superposition, and air pressure of the substrates are performed in the same manner as in the third embodiment, the plastic sheet 37 is fixed, the mask substrate 42 made of quartz glass on which the aluminum is vapor-deposited with a given pattern is held on the two substrates while the substrates are uniformly pressed by pressure reduction so that some of the ultraviolet rays can be shielded, and the sealing agent is set by applying UV rays to the substrates using the ultraviolet irradiator 25.

As described above, in this embodiment, since the mask substrate made of quartz glass on which the aluminum is vapor-deposited with a specific pattern is held on the substrates so that some of the ultraviolet rays can be shielded on the substrates, the portion on the substrates in which a color filter containing an organic dye is formed is prevented from being irradiated with ultraviolet rays and therefore no change takes place in the properties of the organic dye and decomposition thereof due to the ultraviolet rays.

Figure 5A:
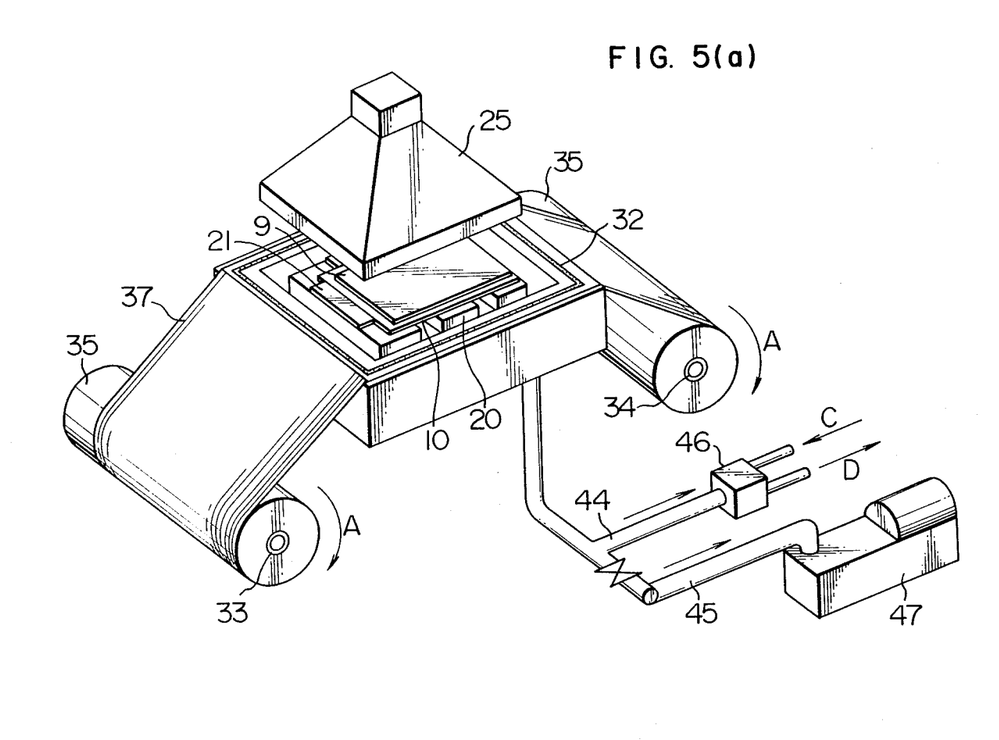

A fifth embodiment of the present invention is described below with reference to FIGS. 5(a) to 5(e). FIG. 5(a) is a perspective view of the bonding/setting apparatus in this embodiment. In FIG. 5(a), reference numeral 44 denotes an evacuation pipe with a combined filter; reference numeral 45, an evacuation pipe with a vacuum pump; reference numeral 46, combined filter (C, D denote the directions of an air flow); and reference numeral 47, a vacuum pump.

When the bonding and setting of the substrates and the formation of a gap are performed, the alignment, superposition and pressing of the substrates are performed in the same manner as in the third embodiment, the plastic sheet 37 is fixed by using the tension controller 35, and a given degree of vacuum is obtained by reducing pressure using the combined filter 46 and then the vacuum pump 47. In this state, the sealing agent is set by applying ultraviolet rays to the substrates using the ultraviolet irradiator 25 while the substrates being uniformly pressed.

Figure 5B:
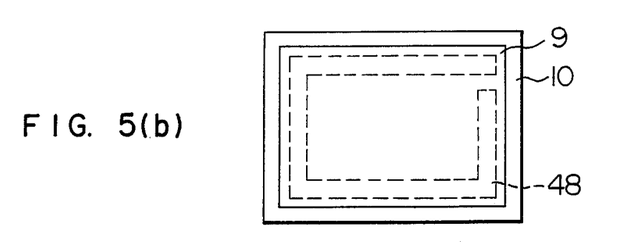
Figure 5C:
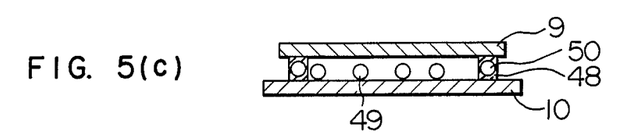
Figure 5D:
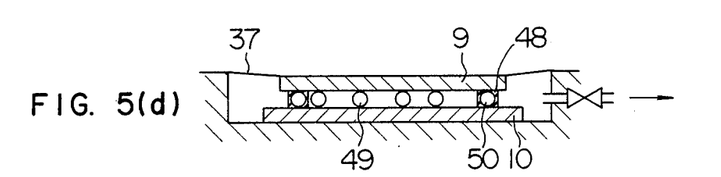
Figure 5E:
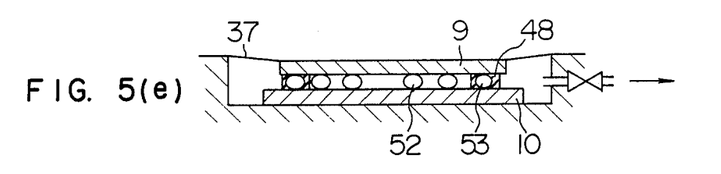

FIGS. 5(b) to 5(e) show the steps in this embodiment. FIG. 5(b) is a plan view in which the two substrates are superposed after being subjected to alignment, FIG. 5(c) is a sectional view of the drawing shown in FIG. 5(b), FIG. 5(d) is a sectional view of the state wherein pressure is gradually reduced until the two substrates are substantially in contact with the sealing agent, and FIG. 5(e) is a sectional view of the state wherein pressure is further reduced to 1 torr or less after being gradually reduced. In the drawings, reference numeral 48 denotes a sealing agent; reference numeral 49, gap materials dispersed on the first electrode substrate 10; reference numeral 50, gap materials dispersed in the sealing agent 48; reference numeral 52, the gap materials which are dispersed on the first electrode substrate 10 and are elastically deformed to some extent; and reference numeral 53, the gap materials which are dispersed in the sealing agent 48 and elastically deformed to some extent.

When the state shown in FIG. 5(a) is changed to the state shown in FIG. 5(d), if pressure is rapidly reduced, the gap materials 49 dispersed on the substrate 10 sometimes spring out from an injection port for a liquid crystal which is formed by the sealing agent 48. However, if pressure is gradually reduced by using the combined filter, no gap materials 49 spring out. In addition, after the two substrates 9, 10 have been brought into the state wherein they are substantially in contact with the gap materials 49, 50, pressure is reduced to 1 torr or less by using the vacuum pump.

Such a vacuum control in two stages can be performed by using the combined filter and the vacuum pump in combination, as in this embodiment, as well as controlling a valve of the vacuum pump.

As described above, in this embodiment, since pressure is reduced by using the combined filter and then the vacuum pump, pressure is not rapidly changed and thus no slippage in the alignment of the substrates occurs during vacuum pressure reduction.

What is claimed is:

1. A method of producing a liquid crystal display element having a first electrode substrate and a second electrode substrate bonded to the first electrode substrate with a gap therebetween, said method comprising the steps of:

holding said first electrode substrate on one of an upper and lower jig of an alignment apparatus, said lower jig having a holding pattern;

holding said second electrode substrate on the other of said upper and lower jig of said alignment apparatus;

relatively moving said upper and lower jigs of said alignment apparatus so as to align said first and second electrodes with each other;

superposing said two substrates together with substantially no slippage therebetween through the intermediary of a photo-settable sealing agent with a gap therebetween pressing said two substrates together through said sealing agent to obtain a temporarily assembled liquid crystal display element;

fixing said temporarily assembled liquid crystal display element to a fixing base which is placed in a case and which has the same holding pattern as that of said lower jig in said alignment apparatus;

placing a transparent plastic sheet on said temporarily assembled liquid crystal display element;

evacuating the space between said fixing base and said plastic sheet to produce a vacuum so as to press said temporarily assembled liquid crystal display element under vacuum; and photo-setting said sealing agent press-bonded to said substrates to obtain a liquid crystal display element.

2. A method of producing liquid crystal display element having a first electrode substrate and a second electrode substrate bonded to the first electrode substrate with a gap therebetween, said method comprising the steps of:

arranging a first electrode substrate, on which at least a photo-settable sealing agent containing gap materials is applied in a pattern, opposite to a second electrode substrate;

aligning said two substrates with each other through the use of an alignment jig apparatus;

superposing said two substrates together with substantially no slippage therebetween through the intermediary of a photo-settable sealing agent with a gap therebetween;

pressing said two substrates together to obtain a temporarily assembled liquid crystal display element;

fixing said temporarily assembled liquid crystal display element on a fixing base in a case which is interposed between a feed roll and a take-up roll for a transparent plastic sheet;

bringing said plastic sheet near said temporarily assembled liquid crystal display element;

evacuating the space between said fixing base and said plastic sheet to produce a vacuum so as to press said temporarily assembled liquid crystal display element together under vacuum; and photo-setting said sealing agent press-bonded to said substrates to obtain a liquid crystal display element;

rotating said take-up roll so as to feed said plastic sheet to prepare for pressing a new temporarily assembled liquid crystal display element.

3. A method of producing a liquid crystal display element having a first electrode substrate and a second electrode substrate bonded to the first electrode substrate with a gap therebetween, said method comprising the steps of:

aligning said first and second substrates with each other using an aligning jig apparatus;

superposing said two substrates with substantially no slippage therebetween through the intermediary of a photo-settable sealing agent with a gap therebetween;

pressing said two substrates to obtain a temporarily assembled liquid crystal display element;

fixing said temporarily assembled liquid crystal display element on a fixing base in a case;

bringing a transparent plastic sheet near said temporarily assembled liquid crystal display element;

gradually reducing pressure in said case to about 160 torr in the space between said fixing base and said plastic sheet, then to 1 torr or less in two or more stages or at two or more pressure reduction rates, to produce a vacuum so as to press said temporarily assembled liquid crystal display element under vacuum; and photo-setting said sealing agent.

* * * * *